United States Patent [19]

Okuda

[11] 4,118,967
[45] Oct. 10, 1978

[54] APPARATUS FOR RELEASING DRIVE ASSEMBLY FROM ROLL NECK AND CONNECTING SAME THERETO

[75] Inventor: Hiroji Okuda, Nara, Japan
[73] Assignee: Koyo Seiko Company Limited, Osaka, Japan
[21] Appl. No.: 818,957
[22] Filed: Jul. 25, 1977
[51] Int. Cl.² .............................................. B21B 31/08
[52] U.S. Cl. ...................................................... 72/239
[58] Field of Search .......................... 72/238, 239, 249

[56] References Cited

U.S. PATENT DOCUMENTS

| 2,815,690 | 12/1957 | O'Malley et al. ....................... 72/239 |
| 3,559,441 | 2/1971 | Lemper et al. ........................ 72/239 |

Primary Examiner—Milton S. Mehr
Attorney, Agent, or Firm—Mason, Fenwick & Lawrence

[57] ABSTRACT

An apparatus for releasing a drive assembly from the neck of a roll of rolling mills and connecting the assembly to the roll neck. The apparatus comprises a pair of rails supported on fixed posts and extending in parallel to the axis of a working roll, a support member slidable on the rails, holding means mounted on the support member for holding the coupling of the drive assembly to be released from or connected to the neck of the roll in pressing with the outer periphery of the coupling, and operating means for slidingly moving the support member on the rails. The coupling is releasable from or connectable to the roll neck with ease for the replacement of the working roll. The apparatus is well-suited to small-sized rolling mills.

3 Claims, 3 Drawing Figures

4,118,967

APPARATUS FOR RELEASING DRIVE ASSEMBLY FROM ROLL NECK AND CONNECTING SAME THERETO

BACKGROUND OF THE INVENTION

The present invention relates to an apparatus for releasing a drive assembly from a driven shaft and connecting the same thereto, and more particularly to an apparatus of this type suited to small-sized rolling mills such as pipe mills in which working rolls are arranged with their axes inclined and intersecting each other.

Rolling mills incorporate an axially extensible drive assembly including a universal joint. Apparatus are known for releasing the coupling of such a drive assembly from the neck of a working roll and connecting the coupling thereto as proposed, for example, in Japanese Patent Application Disclosure No. 4767/1966. The proposed apparatus includes a gear-type coupling connecting the roll neck to the spindle and having a boss (intermediate shaft) joined to the spindle and supported by a bearing at all times. The bearing is rotatably and vertically slidably mounted on upright posts on a frame which is equipped with a support for supporting the outer tube of the coupling. The outer tube on the support is vertically shiftable for adjustment, and the spindle is rotatable. The other boss of the coupling joined to the roll neck is releasable from and connectable to the roll neck by the axial movement of the frame.

However, because the overall frame is adapted to be moved axially of the working roll, the apparatus is large-sized in its entirety and is disadvantageous to use in pipe mills and like small-sized rolling mills in view of maintenance, adjustment and costs. Moreover, since a pair of support means are provided on a single frame for bringing couplings into or out of engagement with a pair of working rolls substantially at the same time, the apparatus is not applicable to pipe mills in which the working rolls are arranged with their axes inclined and intersecting each other.

SUMMARY OF THE INVENTION

An object of this invention is to provide an apparatus suited for use in small-sized rolling mills incorporating working rolls whose axes are inclined and intersect each other, the apparatus being adapted to release axially extensible drive assemblies from the necks of the rolls and to connect the same thereto.

Another object of this invention is to provide a drive assembly releasing and connecting apparatus which is suitable for small-sized rolling mills or the like and which is very simple in construction and easy to maintain.

Still another object of this invention is to make it possible to release a drive assembly from the neck of a roll and conect the same thereto with great ease so that the roll of small-sized rolling mills or the like can be replaced readily within a short period of time.

The apparatus of this invention comprises a pair of rails mounted on fixed posts and extending in parallel to the axis of a working roll, a support member slidably supported by the rails, holding means mounted on the support member for holding the coupling of the drive assembly to be released from or connected to the neck of the roll in pressing engagement therewith, and operating means for slidingly moving the support member on the rails with the coupling held by the holding means.

The rails, the support, the holding means and the operating means are provided for each of two working rolls whose axes intersect each other, such that the couplings for the working rolls are releasable from the necks of the rolls or connectable thereto individually independently or both simultaneously.

The apparatus of this invention is very simple in construction, easy to operate, inexpensive to make and well-suited especially for the drive assemblies of small-sized rolling mills. Because of ease of maintenance and adjustment, the present apparatus functions free of any trouble for releasing two drive assemblies from a pair of working rolls or connecting the drive assemblies to the rolls at the same time.

Other objects and features of this invention will become more apparent from the following description.

DESCRIPTION OF THE PREFERRED EMBODIMENT

Figure 1:
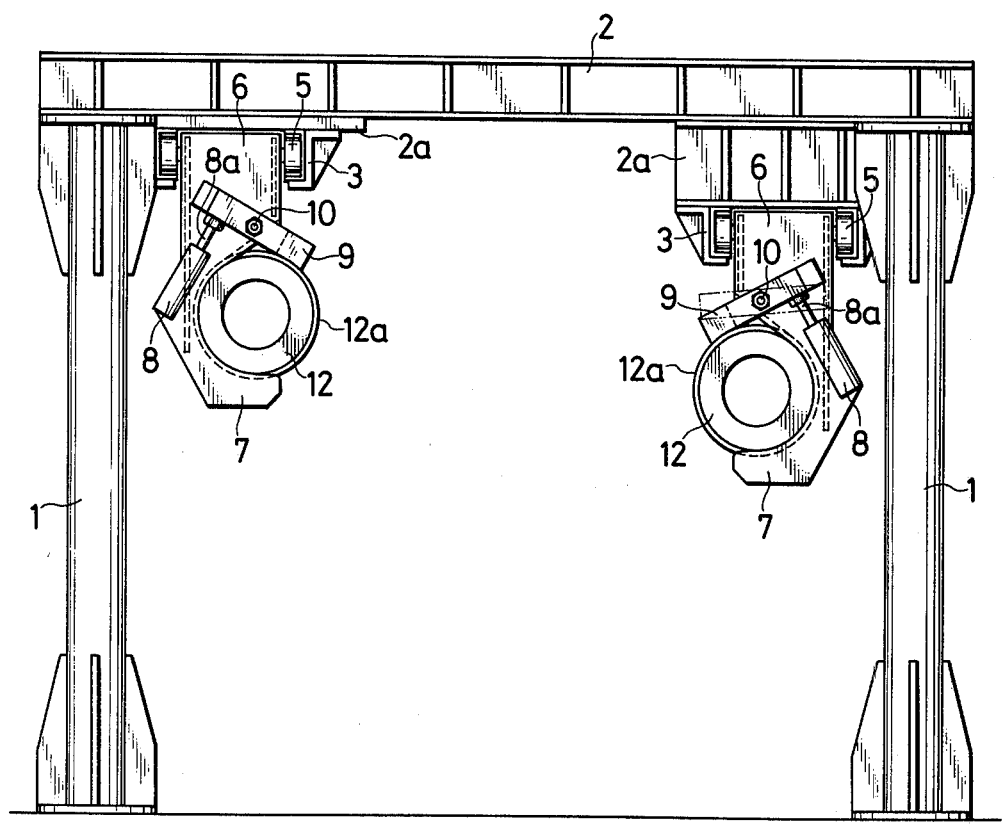
FIG. 1 is a front view showing an embodiment of this invention.

With reference to the drawings, fixed posts 1 are provided thereon with upper members 2 to which two pairs of channel-shaped rails 3 are secured, the rails of each pair facing each other. The pairs of the rails 3 are arranged in parallel to the axes A and B of corresponding working rolls 4 respectively for example with the use of a distance member 2a between the upper members 2 and the rails 3.

Each support member 6 is slidably supported and guided by the pair of rails 3 by means of rollers 5. The support member 6 is integrally provided at its lower end with a coupling holding member 7 in the form of a hook. Opposed to the member 7 is a holder 9 pivoted to the support member 6 and operable by a cylinder 8 for holding the coupling 12 of a drive assembly 11 in pressing contact therewith. The cylinder 8 is secured to the support member 6 and has a piston rod 8a connected at its forward end to the rear end of the holder 9.

The coupling holding member 7 has a coupling holding portion 7a engageable with an outer peripheral projection 12a on the coupling 12. In place of the outer peripheral projection 12a, the coupling 12 may be formed in its outer peripheral surface with a groove for engagement with the holding member 7 and the holder 9.

Each of the support members 6 is slidingly movable by means comprising a cylinder 14 secured at its one end to the upper member 2 by a fixing member 13 and having a piston rod 14a connected at its forward end to the support member 6. The drive assembly 11 includes a universal joint 15.

Each of the working rolls 4 is supported by a stationary stand 16 and an adjustable stand 17 by means of cases 18. The working roll 4 is horizontally movable in parallel to its original position by unillustrated drive means as indicated by the arrow in FIG. 3. The working roll 4 is set at a predetermined angle of inclination by the following means. The inclination of the roll in the vertical direction is determined by a spacer 20 provided between the adjustable stand 17 and a slide housing 19. The inclination angle is usually 5° to 7°. In the horizontal direction, the inclination of the roll is determined by a side housing 21 secure to the slide housing 19 and a slide bearing member 22 provided between the case 18 and the slide housing. Since this portion is not an important feature of this invention, a detailed description will not be given.

Figure 3:
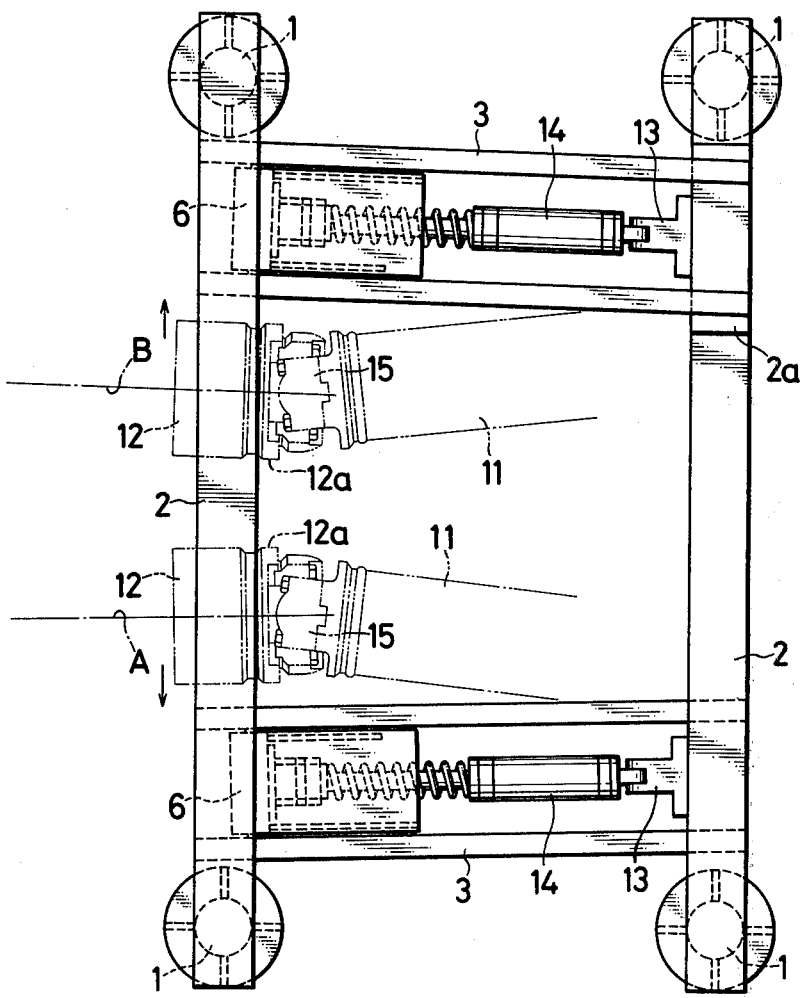
FIG. 3 is a plan view of the same.

For the replacement of the working rolls 4, each of the rolls 4 is horizontally moved sidewise outward in parallel to its original position by the unillustrated drive means as indicated by the arrow in FIG. 3, bringing the coupling 12 into contact with the holding member 7, whereupon the roll is stopped. Each of the cylinders 8 is then actuated, causing the holder 9 to press the coupling 12 against the holding member 7 with the outer peripheral projection 12a in engagement with the coupling holding portion 7a of the members 7.

Figure 2:
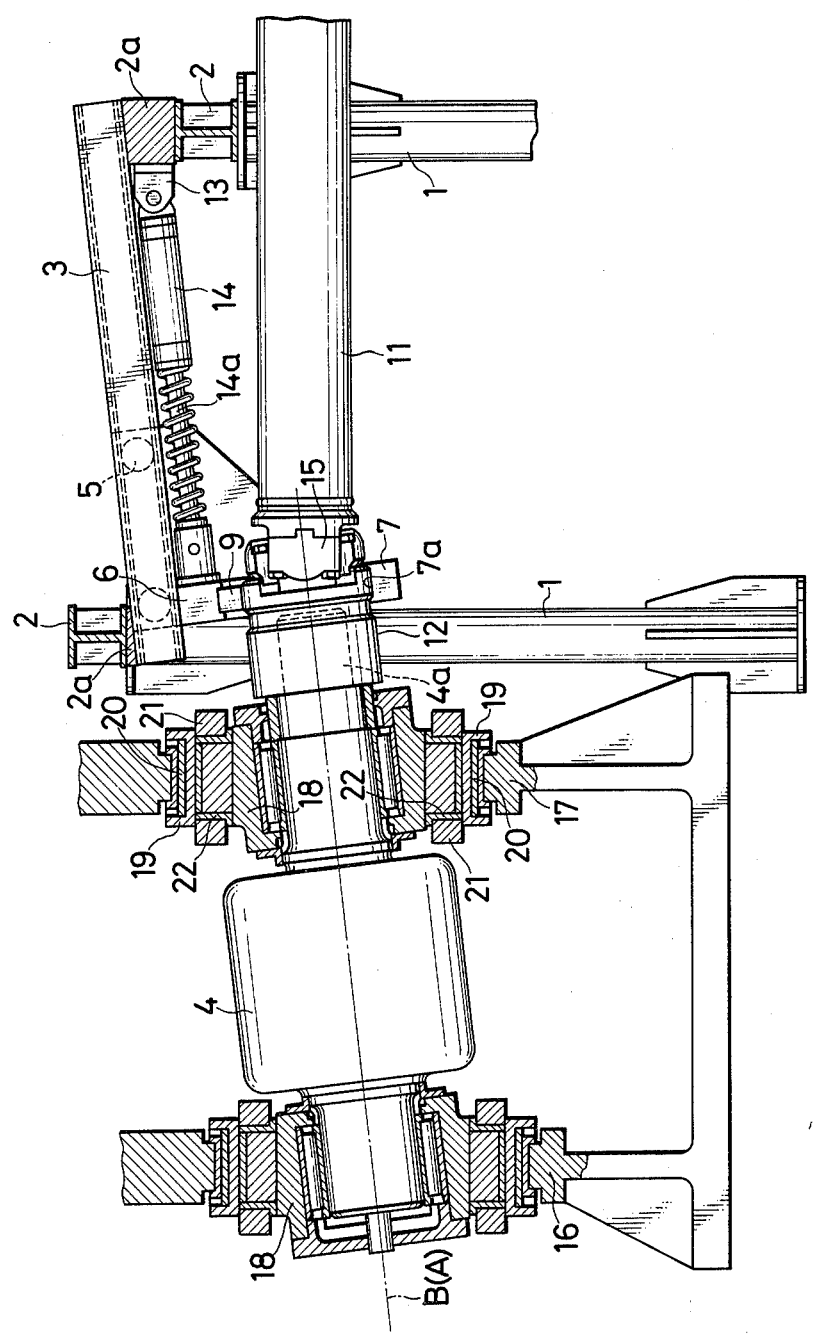
FIG. 2 is a side elevation of the same.

Subsequently, each of the cylinders 14 is actuated to move the support 6 leftward in FIG. 2 and to thereby separate the coupling 12 from the neck 4a of the roll 4. In this state the working roll 4 is replaced by a new one. The drive assembly 11 includes a spindle portion which is axially extensible and collapsible.

Following the above procedure reversely, the coupling 12 is then fitted over the neck 4a of the new roll, the coupling 12 released from the holding means, and the working roll 4 set in position for operation.

What is claimed is:

1. An apparatus for releasing drive assemblies from the necks of two working rolls which are arranged with their axes inclined and intersecting each other and connecting the drive assemblies to the roll necks, comprising:

two pairs of rails secured to posts and extending in parallel to the axes of the working rolls and having the same inclination angle as that of the axes of the working rolls in vertical direction, the rails of each pair facing each other, two support members each slidably supported on each pair of the rails and each integral with a member for holding a coupling of the corresponding drive assembly in contact with the outer periphery of the coupling, two holders each mounted on each of the support members and opposed to the coupling holding member, the holder being engageable with the outer periphery of the coupling to hold the coupling between the holding member, and the holder in pressing engagement therewith, two means each mounted on each of the support members for operating the holder to cause the holder to hold the coupling in pressing engagement therewith, and two means for slidingly moving each of the support members on the rails, including a cylinder secured at its one end to the upper member by a fixing member and having a piston rod connected at its forward end to each of the support members.

2. An apparatus as defined in claim 1 wherein the coupling holding member is in the form of a hook provided at a lower portion of the support member and has a coupling holding portion engageable with an outer peripheral projection on the coupling.

3. An apparatus as defined in claim 1 wherein the coupling holding member is in the form of a hook provided at a lower portion of the support member and has a coupling holding portion engageable in a groove formed in the outer peripheral surface of the coupling.

* * * * *